J. W. NILSSON.
HORSE PROTECTOR.
APPLICATION FILED MAR. 2, 1914.

1,113,815.

Patented Oct. 13, 1914.

WITNESSES
E. M. Callaghan
Alan F. Garnett

INVENTOR
JOHN W. NILSSON,
BY Munn & Co.
ATTORNEYS

THE NORRIS PETERS CO., PHOTO-LITHO., WASHINGTON, D. C.

UNITED STATES PATENT OFFICE.

JOHN W. NILSSON, OF BALFOUR, NORTH DAKOTA.

HORSE-PROTECTOR.

1,113,815.  Specification of Letters Patent.  Patented Oct. 13, 1914.

Application filed March 2, 1914. Serial No. 821,931.

*To all whom it may concern:*

Be it known that I, JOHN W. NILSSON, a citizen of the United States, and a resident of Balfour, in the county of McHenry and State of North Dakota, have made certain new and useful Improvements in Horse-Protectors, of which the following is a specification.

This invention relates to horse protectors, and one of the principal objects of the invention is to provide a device for effectually protecting a horse's mouth from attacks by bot-flies, at the some time allowing normal breathing of the animal.

Another object of the invention is a provision of a protector of the class described so constructed and arranged that when in place on an animal, the latter may eat or drink without the necessity of removing the protector.

A further object of the invention is to provide a protector including a strip of textile material, arranged to hang beneath a horse's mouth, and having rigid braces arranged transversely at its ends, and means arranged centrally of the braces for swingingly securing the latter to a bridle, so that the protector will normally depend below the animal's mouth, and may be engaged by the animal against the edge of a feed trough, bucket or other food receptacle, so as to be held out of the way while the animal eats or drinks as the case may be.

A still further object is the provision of a device of the class described, which will be simple, durable, efficient in operation and inexpensive to manufacture.

Figure 1:
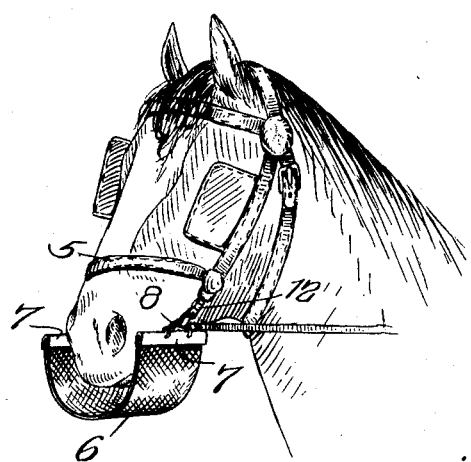
Figure 4:
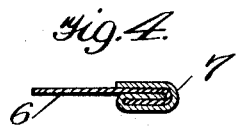
Figure 2:
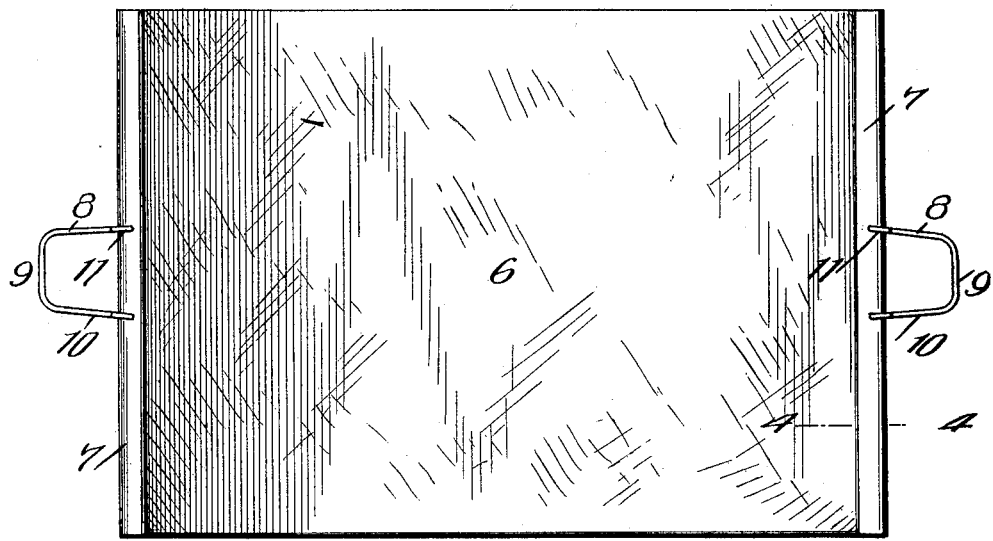
Figure 3:
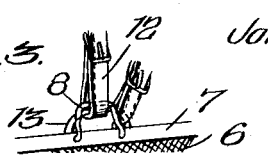

With these and other objects in view which will become apparent as the description proceeds, the invention resides in the construction, combination and arrangement of parts hereinafter more fully described and claimed, and illustrated in the accompanying drawing in which like characters of reference indicate like parts throughout the figures, of which, Figure 1 represents a perspective view of the protector as arranged in operative position, Fig. 2 represents a plan view of the protector laid flat, and Fig. 3 represents a fragmentary detail perspective view showing the manner in which the protector is secured to the bridle. Fig. 4 represents a sectional view on the line 4—4 of Fig. 2.

Referring more particularly to the drawing, 5 indicates a bridle, secured to a horse's head, and 6 indicates the protector. The latter is composed preferably of a rectangular strip of textile material somewhat longer in one dimension than in the other, and secured transversely of the strip at its ends, are metallic braces 7 which are folded over the ends of the strip, and which extend the entire width of said strip.

Centrally of each brace 7 is secured a staple or eye 8 formed of a piece of wire bent into shape to provide a back portion 9 which is substantially straight, and which lies in parallel relation with the adjacent strip 7, and side portions 10 which at their inner ends extend through the adjacent strip and are returned upon themselves, as at 11, for securing the eyes in place.

The protector is arranged so as to hang beneath the animal's mouth, as illustrated in Fig. 1, and in order to position the protector on the bridle, one of the straps on each side of the bridle indicated at 12, which help to support the bit ring 13, is unloosened and passed through the eye 8, and then rebuckled. By this arrangement the protector is swingingly secured to the bridle and normally depends below the horse's mouth, but when the animal is to eat it will soon learn to engage the front edge of the protector against the edge of the food receptacle, so as to swing the protector back during the process of eating, so that it is unnecessary for the protector to be removed when the animal is to feed, or indeed to be removed at all once it has been put on, since it may remain on the bridle and be removed or placed in position on the horse's head with the bridle.

It will be noted that a protector arranged and constructed as set forth, affords protection to the horse's mouth from beneath, and at the same time interferes in no way with the normal breathing of the animal. It is a well known fact that the bot-fly in attacking an animal darts straight up from the ground or near the animal's feet toward its mouth, and very seldom attacks the animal from the front or back or sides on a level with the mouth, so that it is therefore necessary only to afford protection from below the animal's mouth. The protector may be made of heavy canvas, wire netting, or other suitable material.

Although I have described the preferred embodiment of my invention I may desire to make such changes in the construction, combination and arrangement of parts thereof, as do not depart from the spirit of the invention and the scope of the appended claims.

I claim:—

1. A protector of the class described comprising a rectangular strip of textile material, metallic braces clamped to said strip at its ends, and extending transversely of said strip, and an eye secured centrally to each of said metallic braces, said eye comprising a length of wire substantially U-shaped, and extending at its ends through said braces and clamped thereagainst for securing the eye in place, said eyes being adapted to be engaged by the bit ring holding straps of a bridle, whereby the protector may be swingingly depended below an animal's mouth.

2. A protector comprising a strip of flexible material, rigid braces secured transversely of said strip at its ends, and means for swingingly securing said braces centrally of their length to a bridle, whereby the protector may be swingingly depended below an animal's mouth.

JOHN W. NILSSON.

Witnesses:
W. H. SCHCOEYE,
J. W. N. FISHER.

Copies of this patent may be obtained for five cents each, by addressing the "Commissioner of Patents, Washington, D. C."